US008650055B2

(12) United States Patent  (10) Patent No.: US 8,650,055 B2
Davie  (45) Date of Patent: Feb. 11, 2014

(54) IT ASSET MANAGEMENT SYSTEM

(76) Inventor: Robert Davie, Cary, NC (US)

(*) Notice: Subject to any disclaimer, the term of this patent is extended or adjusted under 35 U.S.C. 154(b) by 1377 days.

(21) Appl. No.: 11/971,192

(22) Filed: Jan. 8, 2008

(65) Prior Publication Data

US 2008/0177598 A1  Jul. 24, 2008

Related U.S. Application Data

(60) Provisional application No. 60/883,916, filed on Jan. 8, 2007.

(51) Int. Cl.
*G06Q 10/00*  (2012.01)
(52) U.S. Cl.
USPC ............................................. 705/7.11
(58) Field of Classification Search
None
See application file for complete search history.

(56) References Cited

U.S. PATENT DOCUMENTS

| | | | |
|---|---|---|---|
| 6,654,707 B2 | 11/2003 | Wynn et al. | |
| 6,754,707 B2 * | 6/2004 | Richards et al. | 709/227 |
| 7,174,549 B2 * | 2/2007 | Yoo | 717/174 |
| 7,243,147 B2 * | 7/2007 | Hodges et al. | 709/224 |
| 7,647,327 B2 * | 1/2010 | Aguren | 707/999.1 |
| 2004/0039705 A1 * | 2/2004 | Svancarek et al. | 705/51 |
| 2004/0128374 A1 | 7/2004 | Hodges et al. | |
| 2005/0216757 A1 | 9/2005 | Gardner | |
| 2005/0270843 A1 | 12/2005 | Koren et al. | |
| 2005/0289072 A1 * | 12/2005 | Sabharwal | 705/59 |
| 2006/0274662 A1 | 12/2006 | Tannenbaum | |

* cited by examiner

*Primary Examiner* — Paul Danneman
(74) *Attorney, Agent, or Firm* — DLA Piper LLP (US)

(57) ABSTRACT

The system provides a method to automate the complex processes that occur at the end-of-life of IT hardware assets, and at the same time, increase the resale value of these assets. Using the system, an IT manager is able to identify a scalable number of systems for Secure Disk Wiping, Diagnostic Testing, Hardware Audit, License Recovery and Backup. These tasks are schedule driven in one embodiment, performed on multiple systems simultaneously, and minimizing the usage of network bandwidth. (In one embodiment, the system is agentless). At the same time, an IT manager can increase resale value by; restoring operating systems to hard drives once wiped, diagnostically testing systems, and capturing detailed hardware information all of which can be supplied to potential buyers or new users of repurposed/refurbished components.

7 Claims, 10 Drawing Sheets

Network Discovery Detail

Return to Main Menu | Asset Detail for IP: 205.26.84.101

Print Asset Detail Report

Scan Date: 06/19/2006 14:45:32
- IP Address: 205.26.84.101
- Manufacturer: Compaq
- Make: Evo
- Enclosure: Desktop
- Model: N610c
- Part Number: 470037-720
- Chassis Serial Number: R223JYHZ0107
- Asset Tag: 223-JYHZ01-07
- Operating System: Windows 2000 Professional Service Pack 4 (build 2195)
- CVS License Key*: X234-1029-GHXV-98DD-9F32
- Processor: 1.90 GHz Intel Pentium 4, 16 KB primary cache, 1024 KB secondary cache
- Memory: 1022 MB Installed Memory
  - Slot 'DIMM_1': 512 MB
  - Slot 'DIMM_2': 512 MB
- Drives:
  - Hard Drive: 76.82 GB Usable Hard Drive Capacity (43.01 GB Free Space)
  - CD-ROM: SAMSUNG CD-R/RW SW-252S
  - Floppy Drive: 3.5" format removeable media
  - Display Adapter: INVIDIA GeForce FX 5500 256 MB

Additional User Input

- Acquisition Date: 08/23/2001 — Here the user can enter information that details the asset's business usage. Along with hardware/software data. This information can prove helpful in determining an asset's value to the company.
- Lease Expiration Date: 
- Asset Business Function: Employee Workstation

[Save Changes]   [Return to Summary]

FIGURE 9

IT ASSET MANAGEMENT SYSTEM

This application claims priority to U.S. Provisional Patent Application Ser. No. 60/883,916, entitled "IT Asset Management System," and filed on Jan. 8, 2007, and is incorporated herein in its entirety by reference.

BACKGROUND OF THE SYSTEM

Computer networks are comprised of a large number of individual components, including monitors, computers, keyboards, software applications, disk drives, docking stations and the like. During the life of a computer network, many of these components may be replaced in a gradual manner, or there may be an upgrade where all or nearly all of one or more components will take place in a relatively short time. This is sometimes referred to as an "end-of-life" event for the components being replaced.

There has grown to be a market for refurbished and repurposed computer components that are retired from service by one user and made available to new users after appropriate management of the asset. Often this asset management requires extensive personal involvement of personnel in repurposing the computer components. Some of the tasks include removing data, restoring or upgrading operating systems, testing, cleaning, repairing, and other tasks that can be time consuming.

One problem with current approaches for repurposing computer assets is the use of third parties for the project, leading to the possibility of sensitive and confidential data being exposed.

BRIEF SUMMARY OF THE SYSTEM

The system provides a method to automate the complex processes that occur at the end-of-life of IT hardware assets, and at the same time, increase the resale value of these assets.

Using the system, an IT manager is able to identify a scalable number of systems for Secure Disk Wiping, Diagnostic Testing, Hardware Audit, License Recovery and Backup. These tasks are schedule driven in one embodiment, performed on multiple systems simultaneously, and minimizing the usage of network bandwidth. Keeping these end-of-life processes in-house, an IT manager can ensure that there is no leakage of sensitive corporate data of any type and particularly data that is regulated under HIPAA and Sarbanes-Oxley. At the same time, an IT manager can increase resale value by; restoring operating systems to hard drives once wiped, diagnostically testing systems, and capturing detailed hardware information all of which can be supplied to potential buyers or new users of repurposed/refurbished components.

The system in one embodiment provides an enterprise-level software solution that can operate on a LAN or WAN. The system can simultaneously erase up to 10,000 PCs at a time, with no additional user interaction required. The system provides for remote erasure, HDD Backup (to guard against accidental erasure), Operating System (OS) restoration, including capture of OS licenses, and barcode printing.

BRIEF DESCRIPTION OF THE DRAWINGS

FIG. 9 is an example of network discovery detail.

DETAILED DESCRIPTION OF THE SYSTEM

Figure 1:
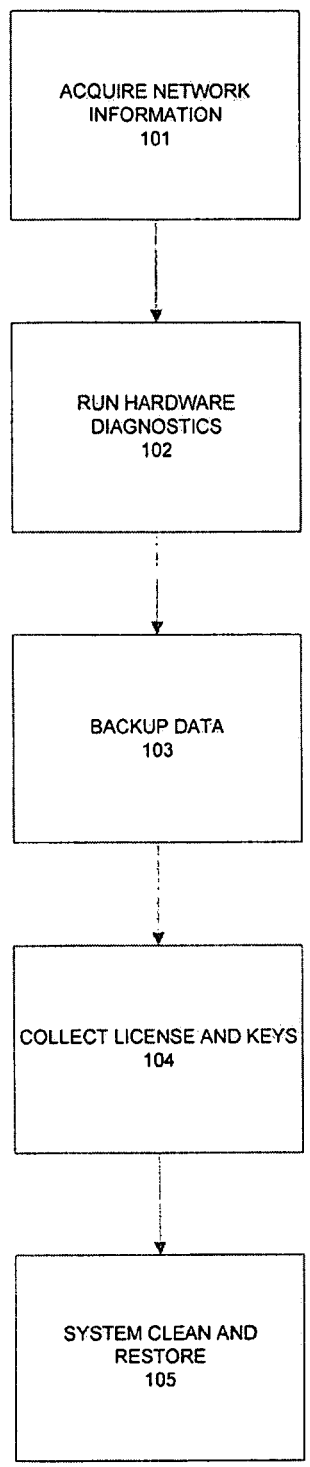
FIG. 1 is a flow diagram illustrating an embodiment of the system.

The system provides a method of identifying, clearing, testing, and repurposing computer assets that may be controlled from a single location. The system includes Network Discovery, Asset Disposal Options, Hardware Diagnostic Tests, Hard Drive Backup, Hard Drive Image Transfer, System Clean and Restore, Hard Drive Sanitization, license recovery, OS restore, and Barcode Assignment. In one embodiment, the system is implemented as controlled use software where a user has a license for a specific number of uses. In one embodiment the software is modular and event-driven, with separate modules for Discovery/Audit, Diagnostic Testing, Backup, Sanitizing, Operating System Restoration, while tracking and limiting the number of systems/times each of these modules is utilized. All portions of this software should prohibit the user from copying for unauthorized use.

Discovery/Audit

This module performs Network Discovery Options.

Network Discovery

The Network Discovery module is used to discover IP addresses and sort by manufacture, by OS, and other identifying characteristics. It discovers all devices attached to the network, all hardware models, parts, serial numbers, OS, board level details and license keys.

During Network Discovery, system identification information (MAC address, GUID, IP address, etc.) are set to be importable from other asset tracking/discovery software. The level of detail to be captured in the Discovery/Audit portion for Windows should, among other data, capture the manufacturer and model details of the installed memory modules, network modules, video cards and disk drives. For unix/linux systems, the software should capture the manufacturer and model details of the system itself plus the installed features. For windows systems, it should capture the OS and license key for later use in the OS Restoration module. The Discovery/Audit data collected should be filterable prior to output to Excel format. (For example, designate to export only the cpu, disk, memory and OS data, while leaving the rest of the data stored.)

The system may use any suitable database for storing the network information that is collected at this stage. The purpose of this module is to collect all of the asset and component information that exists on the network so that appropriate decisions can be made regarding repurposing of assets.

Asset Disposal Options

This step makes decisions on redeployment, recycle, and/or resale. Redeployment may be the transfer of the asset to another user in the company. Recycle may be performed by appropriately environmental methods. All decisions at this stage require the cleaning of the systems and redeployment and resale may require some restoration as well.

Hardware Diagnostic Tests

The Diagnostic module performs tests on hard drives (such as the IBM SMART test), performs battery tests, memory tests and manufacturers diagnostic tests. In one embodiment the system uses WMI for battery charge testing and Smartmontools for S.M.A.R.T testing Windows based systems. As an example the Sun Validation Test Suite (SunVTS) 6.2ps1 for Sun Microsystems may be used when appropriate. The hardware diagnostic tests are selected from a plurality of available tests based on the configuration, manufacturer, OS, ets.

Hard Drive Backup

Backup: Software should allow for backup of all systems designated for wiping, whether 10 or 10,000. These backups should be scheduled, minimize network traffic and backup to central network storage. The backup should confirm that it was performed correctly and allow for a user to separately verify that the backup was indeed performed correctly. In operation, backups are done on every asset, regardless of the ultimate disposition of the asset (redeployment, recycle, resale, etc.)

Hard Drive Image Transfer

This module transfers the hard drive image (e.g. system data) to another system. It is also used to transfer the OS License Key to another system. For example, capturing the license key, the Windows Operating should be able to be restored to a wiped hard drive. The original OEM installed operating system, OS upgrades if necessary, should be re-installed with proper license key.

System Clean and Restore

This is to restore a system to original conditions and settings as appropriate. This may involve restoring OS and license keys, native software and licenses, and testing and confirming settings.

Hard Drive Sanitization

Secure Disk Wiping: The standard for disk wiping in the beta version should be to DOD 50220.22-M and the user should be able to wipe up each system up to 1000 times. Systems should be capable of being backed up to network storage prior to wiping. In one embodiment a wipe configurator is available where the user can choose from a plurality of wipe algorithms. Other wipe algorithms that may be used include, but are not limited to, the following:

Air Force System Security Instructions 5020
Bruce Schneider's algorithm
BSI (German overwrite standard)
German Standard VSITR
HMG Infosec Standard No: 5 (baseline or enhanced)
Navy Staff Office Publication (NAVSOP-5239-26) for RLL
NSA (overwrite standard by National Security Agency)
OPNAVINST 5239.1A
Peter Gutmann's algorithm
The National Computer Security Centre (NCSC-TG-025)
U.S. Department of Defense Sanitizing (DOD 5220.22-M, DD 5220.22-M ECE)
US Army AR380-19

The module may include in one embodiment an Automatic Disk Overwrite Report: This generates results for each disk overwrite that can be printed and saved for permanent records. It makes an overwrite log available and prints a certificate of destruction if desired.

Bar Code Assignment

All peripherals are assigned bar codes for tracking and inventory control.

Reporting

Summary Report: One report, exportable in Excel format, should be generated that includes: selected discovered devices, the discovered data (filtered by user), the diagnostic test results, the secure wipe confirmation, and the operating system version and level restored to the wiped drive. Success Confirmations: A window/report after each Discovery/Audit, Secure Disk Wiping, Diagnostic, Backup and OS Restoration, and barcode printing should tell the user if process was performed correctly or failed for a particular system.

The operation of one embodiment of the system is illustrated in FIG. 1. At step 101 the asset information is acquired from the network. This may take place during the installation of the client. At step 102 appropriate diagnostics are run on the hardware and any repairs are made and unrepairable assets are identified and removed. At step 103 the data on asset storage devices is backed up. At step 104 licenses and keys are collected and validated. At step 105 asset systems are cleaned and restored with OS installations using appropriate licenses and keys.

Scan

Figure 2:
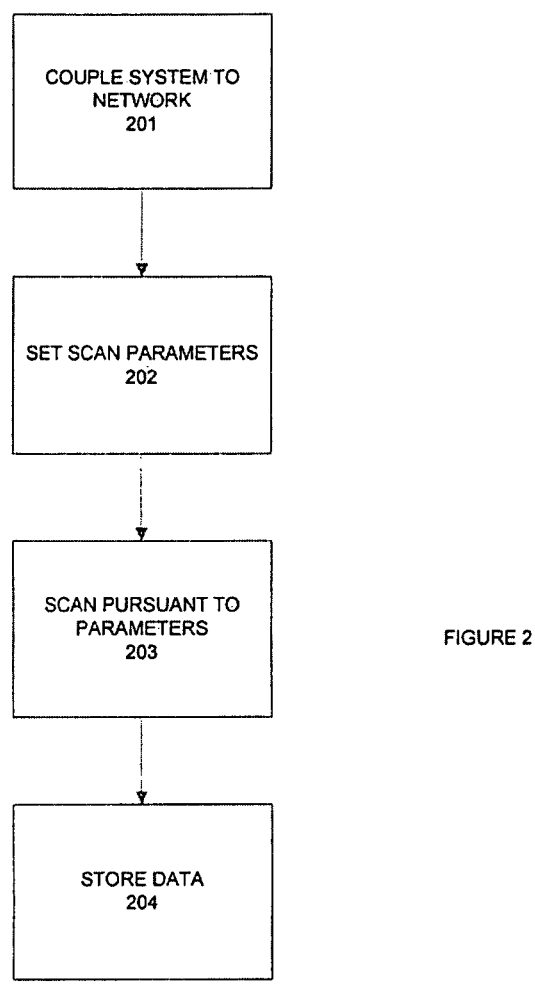
FIG. 2 is a flow diagram illustrating a scan operation in an embodiment of the system.

FIG. 2 is a flow diagram illustrating a scan operation of the system. At step 201 the system is coupled to an organizational network. At step 202 scan parameters are established. These parameters define the functionality and scope of the scan. It can be for the entire network or for a subset of stations or characteristics of a network. The parameters can set an IP address range, select a hardware manufacturer (e.g. IBM, Compaq, HP, Dell, etc.), model/part number, and operating system. These selections are considered to be a parameter set. A plurality of parameter sets can be defined for different address ranges, manufacturers, models, and operating systems. At step 203 the system scans the network pursuant to the parameters selected. These parameters can include IP addresses, MAC addresses, Computer Name, etc. The system can use IP or MAC address ranges for use across the network or some other manner of identifying targeted assets. At step 204 the system stores the scanned data in a database for further use. The data includes each IP address, the manufacturer, model, summary description, serial number, licensed software and OS configuration, and other identifying information.

Network Discovery

Figure 3:
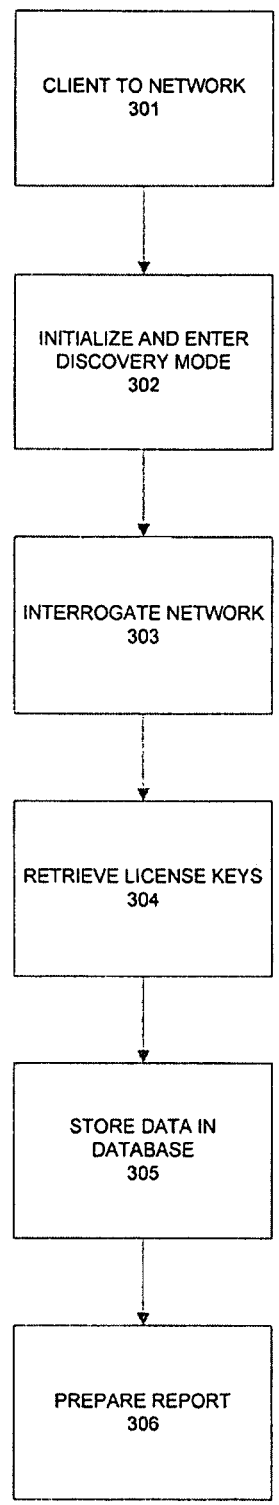
FIG. 3 is a flow diagram illustrating an embodiment of a network discovery operation of the system.

FIG. 3 is a flow diagram illustrating the network discovery phase of the system and is a detailed view of the operation of step 101. At step 301 a client that contains the system software is coupled to a computer or a network of computers that are to be refurbished. At step 302 the system is initialized and the system enters network discovery mode. At step 303 the system interrogates devices on the network. This interrogation includes, but is not limited to, hardware models, parts, serial numbers, and OS details. At step 304 the system retrieves license keys from each station in anticipation of subsequent software restore operations. At step 305 the system stores the collected data in a database for use in recovery and refurbishing operations. At step 306 the system may prepare an optional report of the discovery in a suitable format (e.g. Excel) that can communicate relevant information to the owner or a potential buyer of refurbished assets. FIG. 9 illustrates some of the report information:

Hardware Diagnostic Tests

Figure 4:
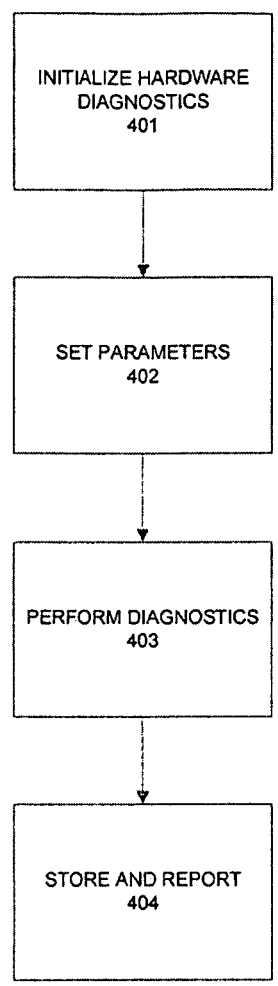
FIG. 4 is a flow diagram illustrating an embodiment of hardware diagnostic operation of the system.

FIG. 4 is a flow diagram illustrating hardware diagnostic testing operations in an embodiment of the system. At step 401 the system initializes the hardware testing operation. At step 402 the user determines the parameters of the diagnostic tests. At step 403 system begins testing pursuant to the parameters. Testing can include S.M.A.R.T. (Self-Monitoring Analysis and Reporting Technology) testing of hard drives and battery tests for laptops. At step 404 the system logs and stores test results, notifying of any out of range results.

Hard Drive Backup and Image Transfer

Figure 5:
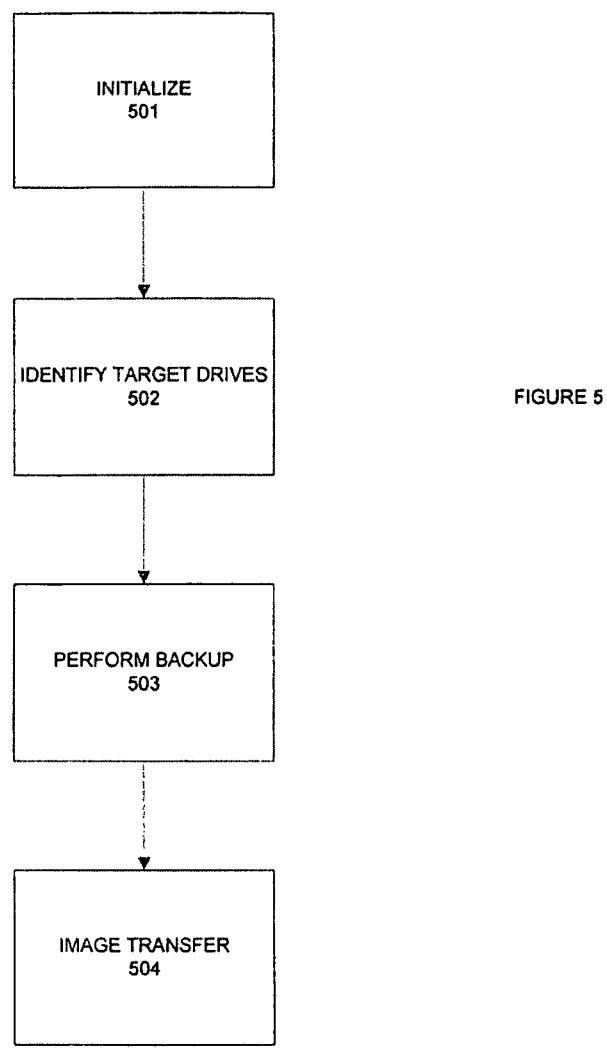
FIG. 5 is a flow diagram illustrating a hard drive backup and image transfer operation using the system.

FIG. 5 is a flow diagram illustrating a hard drive backup and image transfer operation using the system. At step 501 the system initializes. At step 502, using the network discovery information and hardware diagnostic test results, the user determines target drives for backup (it may be all drives or some subset of drives). At step 503 the system performs a full or partial backup (depending on the chosen parameters) to network storage. If desired, at step 504, the system can transfer a drive image to another system or drive.

System Clean and Restore

Figure 6:
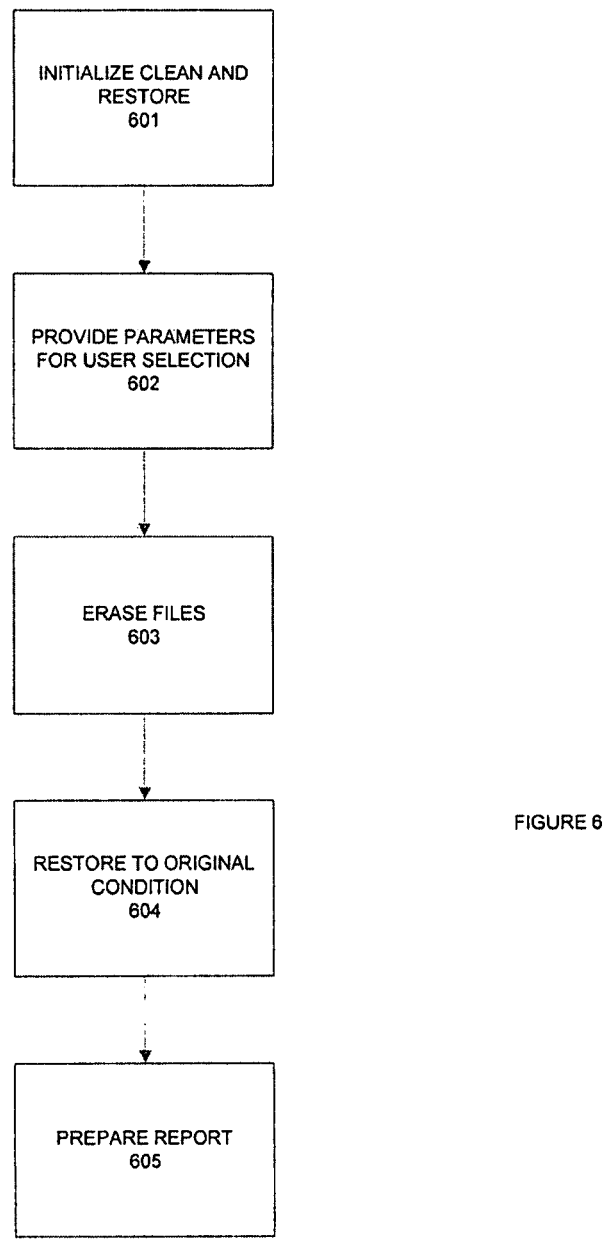
FIG. 6 is a flow diagram illustrating the operation of system clean and restore in one embodiment.

The system provides automatic erasure and/or OS restoration to any number of systems. FIG. 6 is a flow diagram illustrating the operation of system clean and restore in one embodiment. At step 601 the system initializes the clean and restore function. At step 602 the system provides a choice of parameters for the user to select to customize the process. At step 603 the system erases individual files to the desired standard (e.g. DOD standard). At step 604, using backup data previously obtained, the system restores each system to its original condition and settings. At step 605 the system prepares a full report of the operation for auditing purposes.

Hard Drive Sanitation

Figure 7:
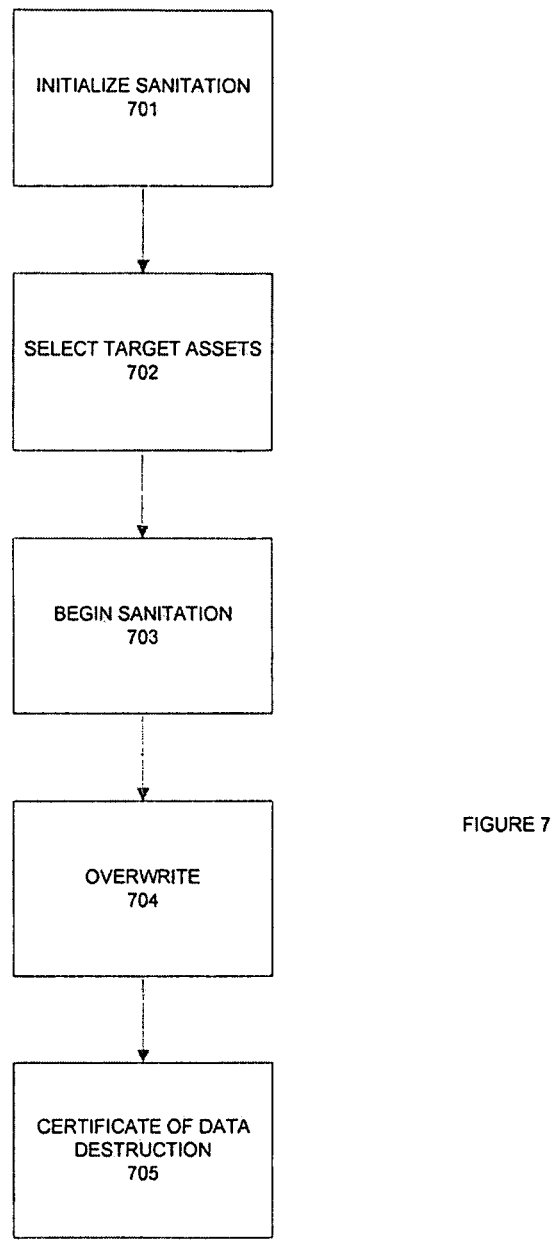
FIG. 7 is flow diagram illustrating hard drive sanitizing.

In some cases, a user wishes to merely sanitize one or more drives. The flow diagram of FIG. 7 illustrates an example of this operation. As step 701 the sanitation operation is initialized. At step 702 the user selects the drive or drives to be sanitized At step 703 the sanitation process is initiated The system performs sanitation of the drives over the network pursuant to suitable standards (such as DOD standards). The system allows for repeated overwrite (up to 10,000 or more times) at step 704. At step 705 a certificate of data destruction is generated for records purposes.

OS Restoration

Figure 8:
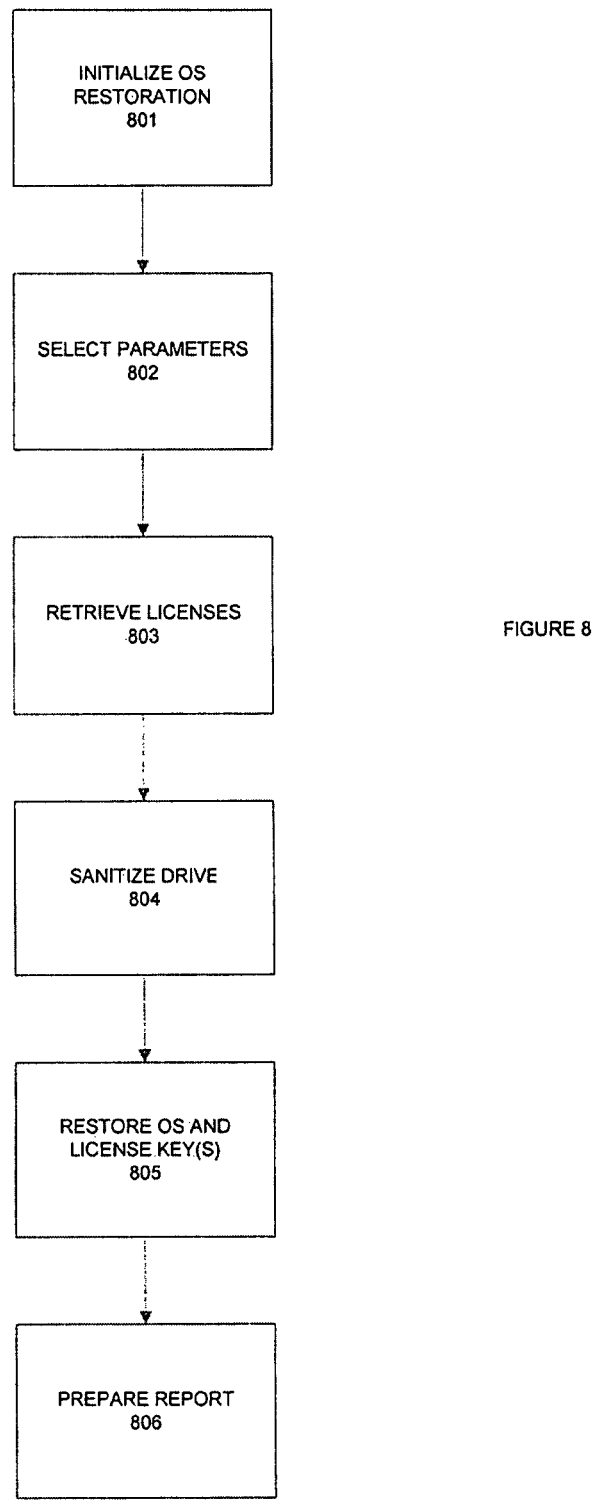
FIG. 8 is a flow diagram illustrating OS restoration in an embodiment of the system.

The system provides for automatic OS restoration over a network (LAN or WAN). FIG. 8 is a flow diagram of this operation. At step 801 the OS Restoration operation is initialized. At step 802 the user selects desired parameters for the OS restoration. At step 803 the system obtains the necessary OS licenses. This may be via retrieval from the database in a prior operation or it may be by implementing a license retrieval operation during this process. At step 804 the system sanitizes the drive (if necessary, the drive may have been sanitized in a prior operation). At step 805 the system writes the appropriate OS to the drive with an associated license. This license may include the product key as well as the embedded and/or encrypted OEM hardware/OS correlated license key that has been retrieved by the system. At step 806 the system prepares a report of the operation.

Barcode Assignment

The system automatically assigns barcode values to system assets and peripherals for tracking purposes, as desired.

Embodiment of Computer Execution Environment (Hardware)

Figure 10:
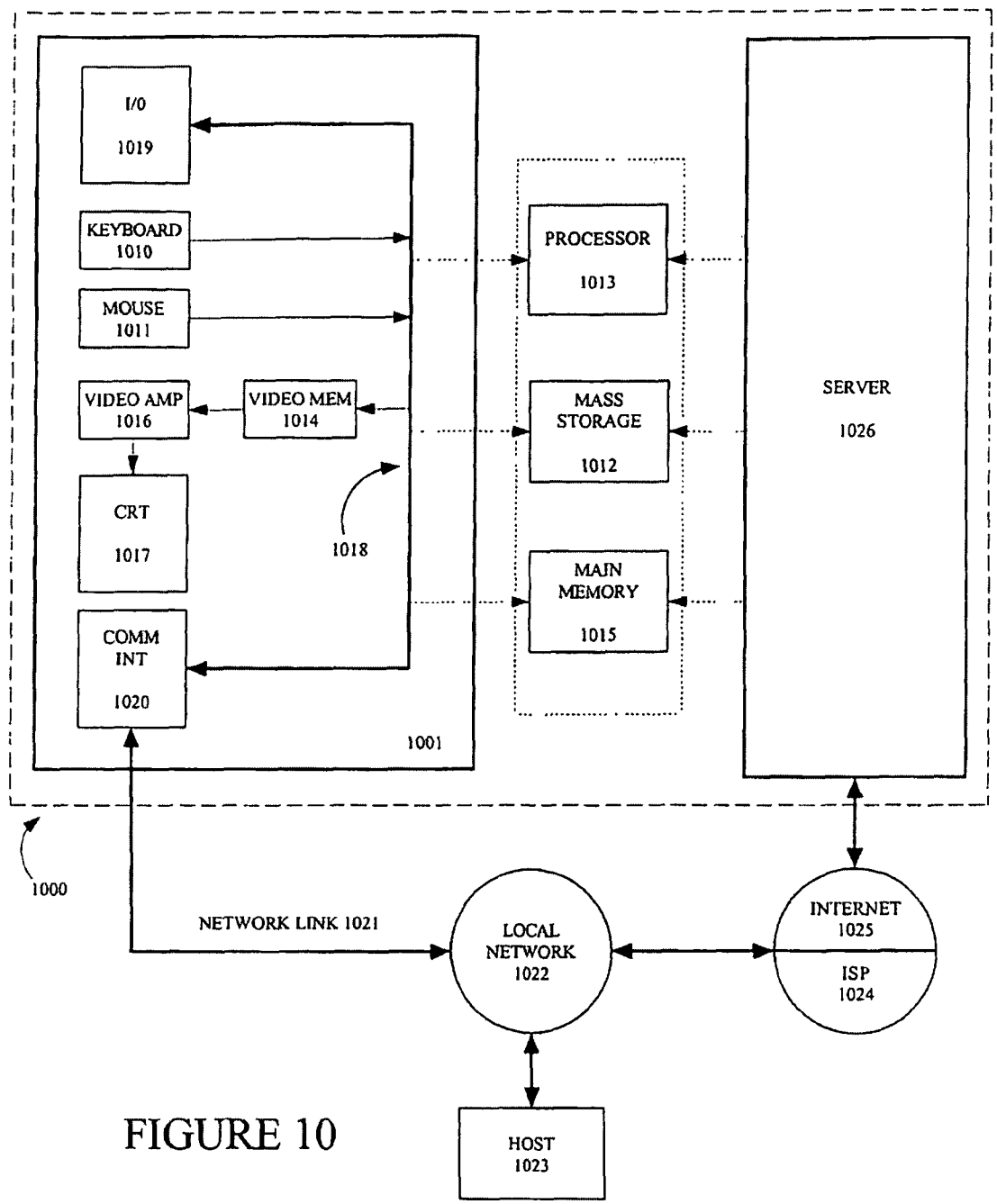
FIG. 10 is an example of a sample computer system for implementing the system.

An embodiment of the invention can be implemented as computer software in the form of computer readable program code executed in a general purpose computing environment such as environment 1000 illustrated in FIG. 10, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 1010 and mouse 1011 are coupled to a system bus 1018. The keyboard and mouse are for introducing user input to the computer system and communicating that user input to central processing unit (CPU 1013. Other suitable input devices may be used in addition to, or in place of, the mouse 1011 and keyboard 1010. I/O (input/output) unit 1019 coupled to bi-directional system bus 1018 represents such I/O elements as a printer, A/V (audio/video) I/O, etc.

Computer 1001 may include a communication interface 1020 coupled to bus 1018. Communication interface 1020 provides a two-way data communication coupling via a network link 1021 to a local network 1022. For example, if communication interface 1020 is an integrated services digital network (ISDN) card or a modem, communication interface 1020 provides a data communication connection to the corresponding type of telephone line, which comprises part of network link 1021. If communication interface 1020 is a local area network (LAN) card, communication interface 1020 provides a data communication connection via network link 1021 to a compatible LAN. Wireless links are also possible. In any such implementation, communication interface 1020 sends and receives electrical, electromagnetic or optical signals which carry digital data streams representing various types of information.

Network link 1021 typically provides data communication through one or more networks to other data devices. For example, network link 1021 may provide a connection through local network 1022 to local server computer 1023 or to data equipment operated by ISP 1024. ISP 1024 in turn provides data communication services through the world wide packet data communication network now commonly referred to as the "Internet" 1025. Local network 1022 and Internet 1025 both use electrical, electromagnetic or optical signals which carry digital data streams. The signals through the various networks and the signals on network link 1021 and through communication interface 1020, which carry the digital data to and from computer 1000, are exemplary forms of carrier waves transporting the information.

Processor 1013 may reside wholly on client computer 1001 or wholly on server 1026 or processor 1013 may have its computational power distributed between computer 1001 and server 1026. Server 1026 symbolically is represented in FIG. 10 as one unit, but server 1026 can also be distributed between multiple "tiers". In one embodiment, server 1026 comprises a middle and back tier where application logic executes in the middle tier and persistent data is obtained in the back tier. In the case where processor 1013 resides wholly on server 1026, the results of the computations performed by processor 1013 are transmitted to computer 1001 via Internet 1025, Internet Service Provider (ISP) 1024, local network 1022 and communication interface 1020. In this way, computer 1001 is able to display the results of the computation to a user in the form of output.

Computer 1001 includes a video memory 1014, main memory 1015 and mass storage 1012, all coupled to bidirectional system bus 1018 along with keyboard 1010, mouse 1011 and processor 1013.

As with processor 1013, in various computing environments, main memory 1015 and mass storage 1012, can reside wholly on server 1026 or computer 1001, or they may be distributed between the two. Examples of systems where processor 1013, main memory 1015, and mass storage 1012 are distributed between computer 1001 and server 1026 include the thin-client computing architecture developed by Sun Microsystems, Inc., the palm pilot computing device and other personal digital assistants, Internet ready cellular phones and other Internet computing devices, and in platform independent computing environments, such as those which utilize the Java technologies also developed by Sun Microsystems, Inc.

The mass storage 1012 may include both fixed and removable media, such as magnetic, optical or magnetic optical storage systems or any other available mass storage technology. Bus 1018 may contain, for example, thirty-two address lines for addressing video memory 1014 or main memory 1015. The system bus 1018 also includes, for example, a 32-bit data bus for transferring data between and among the components, such as processor 1013, main memory 1015, video memory 1014 and mass storage 1012. Alternatively, multiplex data/address lines may be used instead of separate data and address lines.

In one embodiment of the invention, the processor 1013 is a microprocessor such as manufactured by Intel, AMD, Sun, etc. However, any other suitable microprocessor or microcomputer may be utilized. Main memory 1015 is comprised of dynamic random access memory (DRAM). Video memory 1014 is a dual-ported video random access memory. One port of the video memory 1014 is coupled to video amplifier 1016. The video amplifier 1016 is used to drive the cathode ray tube (CRT) raster monitor 1017. Video amplifier 1016 is well known in the art and may be implemented by any suitable apparatus. This circuitry converts pixel data stored in video memory 1014 to a raster signal suitable for use by monitor 1017. Monitor 1017 is a type of monitor suitable for displaying graphic images.

Computer 1001 can send messages and receive data, including program code, through the network(s), network link 1021, and communication interface 1020. In the Internet example, remote server computer 1026 might transmit a requested code for an application program through Internet 1025, ISP 1024, local network 1022 and communication interface 1020. The received code maybe executed by processor 1013 as it is received, and/or stored in mass storage 1012, or other non-volatile storage for later execution. In this manner, computer 1000 may obtain application code in the form of a carrier wave. Alternatively, remote server computer 1026 may execute applications using processor 1013, and utilize mass storage 1012, and/or video memory 1015. The results of the execution at server 1026 are then transmitted through Internet 1025, ISP 1024, local network 1022 and communication interface 1020. In this example, computer 1001 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

What is claimed is:

1. A method for automatically managing computer assets comprising:
   in a processing system;
   discovering presence and identification information of computer assets on a network coupled to the processing system;
   capturing the license key comprising a product key and Operating System correlated license key for each asset and storing the license key in a remote storage location;
   performing diagnostic tests on the discovered assets;
   backing up the data of the discovered assets;
   restoring Operating System and software with licenses on selected assets by retrieving a license key for each asset to be restored from the remote storage location wherein the license key comprises a product key and Operating System correlated license key, sanitizing each asset, and restoring an original installed Operating System to each asset using the license key of each asset from the remote storage location;
   sanitizing data storage on non-selected assets; and
   generating a report that comprises selected assets, diagnostic test results on the selected assets, confirmation of the sanitization of the selected assets, and the Operating System restored to the selected assets.

2. The method of claim 1 wherein the network is a LAN.

3. The method of claim 1 wherein the network is a WAN.

4. The method of claim 1 wherein performing diagnostic tests on said assets is accomplished by defining assets to be tested, establishing parameters of the diagnostic tests, and performing the diagnostic tests pursuant to the parameters.

5. The method of claim 1 wherein backing up the assets is accomplished by defining assets to be backed up and performing the backup of those assets.

6. The method of claim 1 wherein performing sanitizing is accomplished by selecting assets to be sanitized, erasing the assets, overwriting the assets as desired, and preparing a certificate of data destruction for each asset.

7. The method of claim 6 wherein sanitization is performed pursuant to one of DOD standards 50220.22M and 50, 5220.22-M, and 5220.22-M ECE.

* * * * *